Dec. 17, 1935.  H. D. GEYER  2,024,637

STORAGE BATTERY CONTAINER

Filed Jan. 29, 1932  2 Sheets-Sheet 1

Inventor
HARVEY D. GEYER
By Spencer Hardman & Fehr
his Attorneys

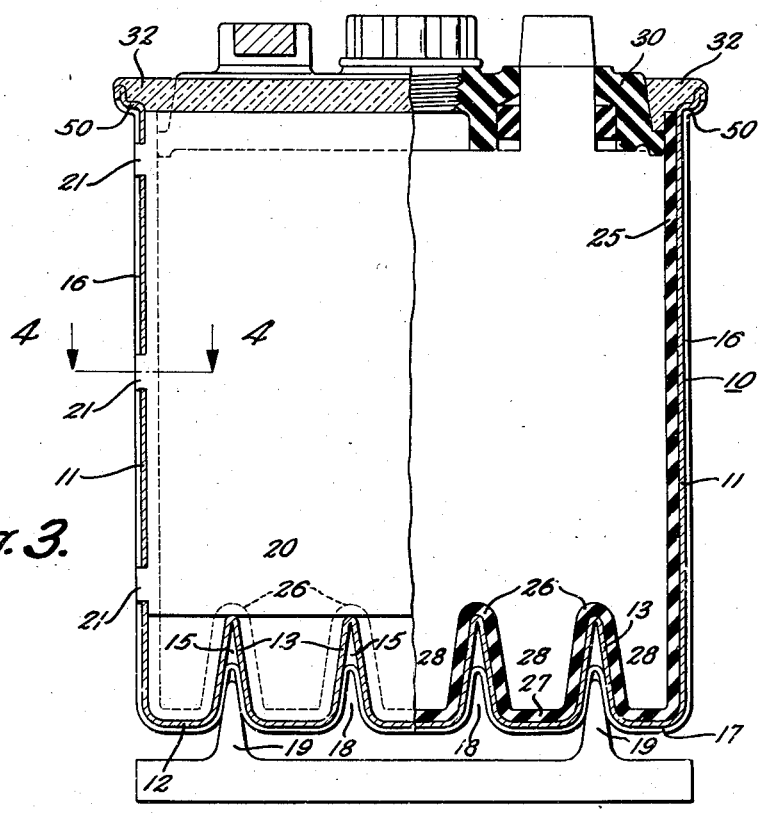
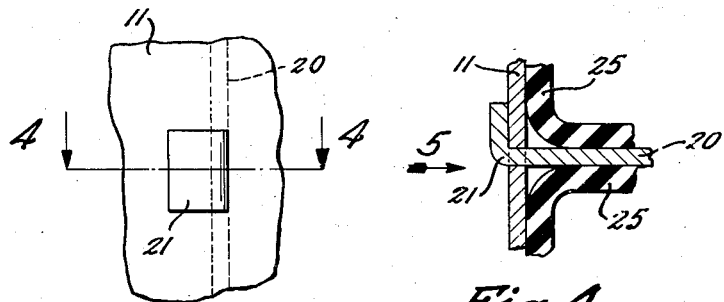

Patented Dec. 17, 1935

2,024,637

UNITED STATES PATENT OFFICE 2,024,637

STORAGE BATTERY CONTAINER

Harvey D. Geyer, Dayton, Ohio, assignor, by mesne assignments, to General Motors Corporation, Detroit, Mich., a corporation of Delaware Application January 29, 1932, Serial No. 589,616

5 Claims. (Cl. 136—166)

This invention relates to storage battery containers, particularly to containers for such storage batteries as are adapted for use in present day automobiles.

Such present day storage battery cases in general use are made as a one-piece molded container either of a hard rubber composition, which is expensive, or of a fibrous bituminous compound which is much less expensive than hard rubber but which has a number of defects. The fibrous bituminous case after a period of use often develops an acid leak due to the battery acid slowly working into the bituminous compound and causing the fibrous material therein to swell or expand. This swelling often develops a small crevice in the cell wall which of course permits the acid to enter further into the cell wall and attack deeper-lying fibrous material. It is thus seen that the action of the battery acid will be progressive and in time, in many instances, will cause an acid leak to develop either through the partition wall or through the outside walls of the container. Bituminous compound containers are also susceptible of cracking under a blow such as may be caused by a stone being thrown up by the auto wheels and striking the battery. Any incipient crack caused by such a blow will sooner or later develop into a leak due to the progressive action of the acid on the bituminous compound as above described. Also incipient cracks are often developed in the partitions between the cells due to high pressure thereagainst caused by a buckling of the battery plates. The above described progressive action of the acid will then cause an acid leak through the partition wall sufficient to provide electrical connection between the electrolyte in the two adjacent cells. The two cells will then be short-circuited through the leak connection if these cells are connected in series through external connections as customary. Hence it is obvious that even a very small leak through the cell partition walls will have a very harmful effect upon the battery.

Also molded one-piece battery cases must have quite thick walls and hence quite heavy weight in order to withstand the attacks thereupon as above described, and to withstand the rough handling ordinarily given them when handled at service stations.

Now the object of this invention is to provide a battery case which will avoid the above described defects of present day battery cases. In the battery case of this invention a pressed sheet metal outer case is provided with separate cell compartments into which molded soft flexible rubber cell jars are snugly fitted so as to be properly reinforced and supported by the exterior sheet metal walls. The relatively light and rigid sheet metal outer case provides the desired strength and resistance to sharp blows thereupon and any rough handling to which it may be submitted, and the flexible rubber cell jars provide permanent leak-proof containers for the acid and battery elements. There is no possibility of the partitions between the cells giving away due to high pressure on one side of a partition caused by a buckling of the battery plates in one cell because even though said high pressure may cause a deflection of the metal partition the flexible rubber wall of the cell jar will yield and follow the deflected partition without endangering rupture thereof. Obviously such possible bulging of the partition cannot cause the cell jar to leak or establish acid communication between two adjacent cells.

Another feature of this invention is the snug fitting of the separate hard composition cell covers within the upper portions of the yieldable rubber cell jars. Since the cell jars are of soft resilient rubber these hard molded cell covers are easily fitted very snugly therein to provide neat closed joints around said covers which will prevent the acid splashing through these joints during handling of the filled battery prior to the application of the cover sealing compound, and will also prevent any of the molten sealing compound flowing through these joints into the cell during application of the sealing compound.

Another feature of the invention is the termination of the top edges of the rubber cell jars and the metal partitions below the top edges of the outer walls of the metal container and the complete covering of these top edges with the cover sealing compound. Thus all possibility of acid entering between the rubber cells and the metal walls adjacent thereto is avoided and the sheet metal thus protected from attack by any acid spilled upon the top of the battery. The pressed metal container is preferably made from sheet steel due to its cheapness and relative lightness, strength, and rigidity compared to lead or other metal which would not be so easily corroded by the battery acid.

Another feature of the invention is the deeply corrugated bottom of the outer metal container which conforms with and supports the corresponding corrugations in the soft rubber cell jars which provide battery plate supports and sediment spaces of substantial size at the jar bottoms. With this construction the cell jars may be molded of soft flexible rubber with corrugated bottom walls of substantially the same thickness as the side walls since the corrugations on the metal bottoms fully support and retain the soft rubber corrugations in place to properly support the weight of the battery plates.

Another feature is the structure of the outer metal container whereby it may be made at low cost. The two side walls and the corrugated bottom wall are made in one piece and the two end walls are separate stampings fixed thereto by welding or lock-seam, while the transverse partitions are also separate pieces of sheet metal fixed to the container sides by welding or by integral lugs thereon projecting through holes in the side walls.

Further objects and advantages of the present invention will be apparent from the following description, reference being had to the accompanying drawings, wherein a preferred embodiment of one form of the present invention is clearly shown.

In the drawings:

Fig. 3 is a transverse section on line 3—3 of Fig. 1, the left half thereof showing the metal partition in elevation contacting with the tops of the corrugations on the bottom of the metal case.

Fig. 4 is a detail sectional view on an enlarged scale taken on line 4—4 of Fig. 3, showing how the metal partitions may be secured to the side walls.

Fig. 5 is an elevation of Fig. 4 looking in the direction of arrow 5.

Similar reference characters refer to similar parts throughout the several views.

Figure 1:
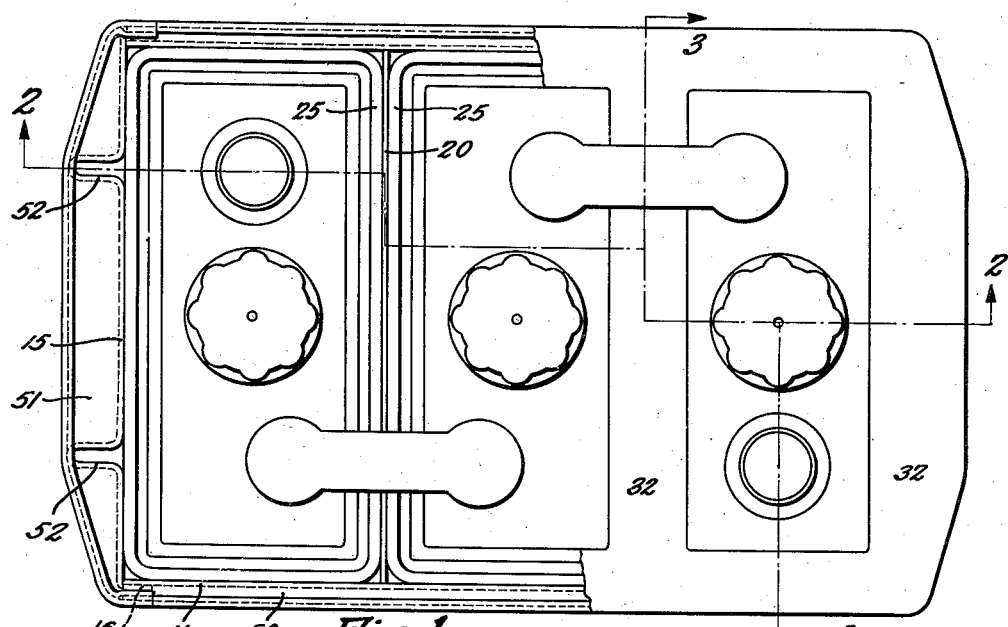
Fig. 1 is a plan view of a battery having a case made according to this invention. The sealing compound for sealing the cell covers in place is omitted on the left side of the figure.
Figure 2:
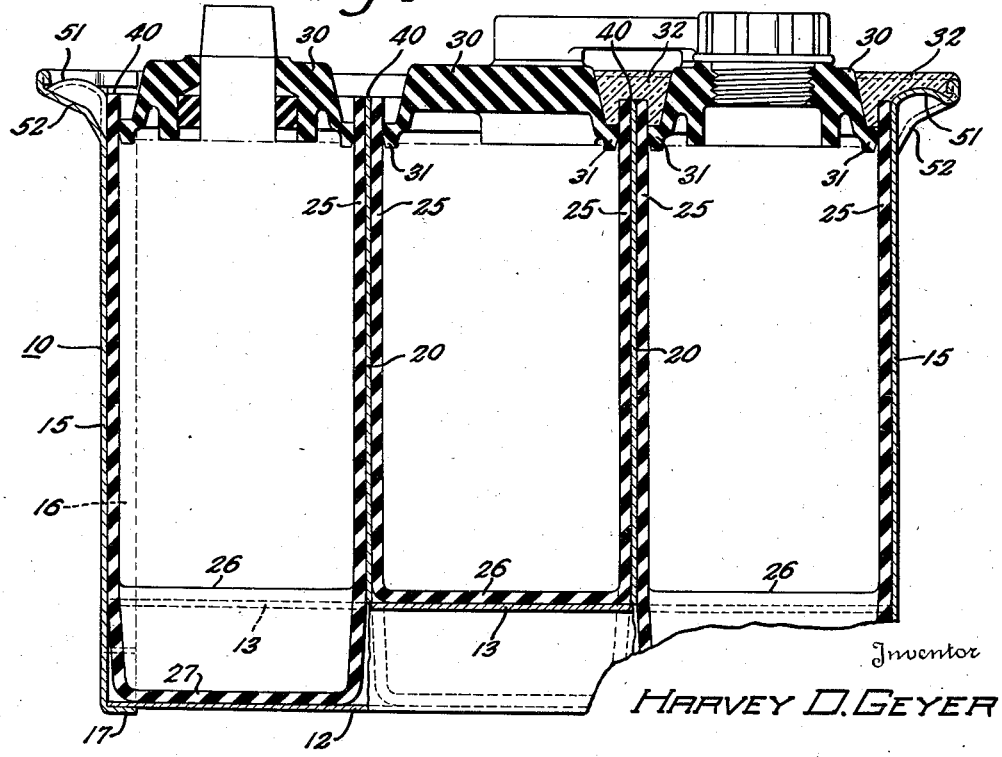
Fig. 2 is a vertical section on line 2—2 of Fig. 1, the section through the central cell being taken through the apex of one of the bottom corrugations.

Reference numeral 10 designates the outer metal case as a whole. This case 10 is preferably formed of pressed sheet steel, the two side walls 11 and the bottom 12 being an integral stamping. The metal bottom 12 is provided with a series of quite deep open-end corrugations 13 which extend the full length of the case 10, as shown in Fig. 2, thereby providing quite a simple stamping from a manufacturing viewpoint since the sheet metal does not have to be drawn to form the deep corrugations 13 but is merely folded in suitable stamping dies to form these corrugations 13. The two end walls 15 are separate sheet metal stampings having suitable marginal flanges 16 overlapping the side walls 11 (see Fig. 1) and a bottom flange 17 overlapping the bottom wall 12. End walls 15 are preferably cut out at the bottom substantially conforming to the corrugations 13 in bottom wall 12 (see Fig. 3). The open bottom grooves 18 formed by corrugations 13 thus extend entirely across the bottom of case 10 and provide a very convenient means for supporting the battery upon the wedge-shaped supports 19. When the battery is set down upon the wedge supports 19 and then clamped down in the usual manner it is impossible for it to be jostled out of position. The flanges 16 and 17 may be welded to the walls 11 and 12 respectively, or they may be otherwise suitably fixed thereto such as by a lock seam.

The transverse metal partitions 20 may terminate at the tops of the metal corrugations 13 (see Figs. 2 and 3) thus dividing the case 10 into cell compartments which however intercommunicate below partitions 20 in the spaces between corrugations 13. Such termination of partitions 20 does not prevent the proper support of the soft rubber cell jars 25, as will be described below, and obviously materially simplifies the structure and reduces the cost of manufacture of the metal case 10. Partitions 20 are suitably fixed to the metal side walls 11 and also serve as reinforcing bridges for the metal case 10. As shown in the drawings, partitions 20 have integral lugs 21 projecting through corresponding holes in walls 11 and are then bent or clinched over on the outside as clearly shown in Figs. 4 and 5.

The separate cell jars 25 are molded of high grade soft flexible rubber and fit snugly within the cell compartments so that the metal partitions 20 and the metal walls of case 10 lie in close contact with the flexible rubber walls and so reinforce and support same against outward distortion. The bottoms 27 of these jars 25 are molded with soft rubber corrugations 26 which conform with and seat snugly upon the metal corrugations 13 and are fully reinforced and supported thereby, so that the weight of the battery plates (not shown) which rest upon the apexes of corrugations 26 will be properly supported. The open spaces 28 in between the corrugations 26 in the jars 25 serve as sediment deposit chambers. It is thus seen that the soft rubber jars 25 are simply molded in one piece, having all walls thereof of substantial uniform thickness, and that they require no separate hard rubber or other battery plate support members at the bottoms thereof to form the necessary sediment deposit chambers.

The molded hard rubber cell covers 30 have a slightly beveled marginal flange 31 (see Fig. 2) which permits these covers 30 to be pressed snugly within the tops of the yielding rubber jars 25 after the battery plates have been pressed into the cell jars. This provides a very snug neat fit between the cover and jar and not only aids in sealing the acid within the jar but also prevents possibility of the cover sealing compound 32, which is ordinarily applied in molten condition, from leaking down past the cover into the cell while in molten state.

Another feature of the invention is the use of the cover sealing compound 32 to completely seal the joints between the rubber walls of jars 25 and the metal walls in contact therewith and so prevent all possibility of acid getting in these joints. For this purpose the upper edges of jars 25 and the metal partitions 20 terminate at 40 below the top edges of the outer walls of case 10. Hence when the sealing compound 32 is applied around covers 30 up to the level of the top edges of case 10 the tops of the rubber jars 25 and partitions 20 will be entirely covered and the interior metal walls of case 10 thereby fully protected against acid corrosion (see Fig. 2).

Preferably the outer metal walls 11 and 15 are provided with lateral flanges 50 and 51 respectively on their upper edges which stiffen these walls and also protect these metal walls from acid attack to a large extent by permitting their upper edges to be substantially covered with the sealing compound 32, as shown in Figs. 2 and 3.

The end flanges 51 are preferably sufficiently wide and also serve as handles for the battery, and may be further stiffened by the small depending ribs 52 pressed in the sheet metal. The sealing compound 32 covers the entire upper portion of the battery except the cell covers 30 and so provides a neat appearing upper surface (see right side of Fig. 1). The sheet steel case 10 is fully protected against acid attack on its interior surfaces as hereinabove described, and its exterior surfaces may be easily coated with an acid proof enamel to protect same from the small amount of acid which may possibly be spilled or splashed upon the exterior walls in handling the battery. Of if desired the exterior metal walls may be coated with a thin lead coating which will serve the same purpose.

It is thus seen that this invention provides a relatively light strong rigid pressed sheet metal outer case, which may be suitably made of sheet steel since the metal is substantially protected against acid corrosion. Pressed steel battery cases have never heretofore been thought practical for automobile batteries due to the fact that in all prior designs the steel case has been susceptible to attack by the battery acid and consequent rapid corrosion thereof. The soft rubber cell jars 25 of course will resist acid attack indefinitely and are fully protected against mechanical injury by the sheet steel case 10.

While the form of embodiment of the present invention as herein disclosed, constitutes a preferred form, it is to be understood that other forms might be adopted, all coming within the scope of the claims which follow.

What is claimed is as follows:

1. A storage battery box having a plurality of cells comprising: a pressed sheet metal outer container having two opposite side walls and its bottom wall formed integral, said bottom wall having integral deep corrugations therein and extending the length of said container and serving as plate supports for all the separate cells, separate sheet metal end walls and transverse partitions fixed in place in said container and thus forming a plurality of cell compartments, and a molded flexible rubber cell jar inserted snugly within each compartment, the flexible rubber bottoms of said jars being molded with corrugations approximately conforming to said metal corrugations and adapted to be flexed to fit accurately upon said metal corrugations by the weight of the electrolyte.

2. A storage battery box having a plurality of cells comprising: a pressed sheet metal outer container having two opposite side walls and its bottom wall formed integral and two separate metal end walls, said bottom wall having continuous corrugations therein and extending the length of said container and serving as plate supports for all the separate cells, metal partitions fixed in place in said container and serving both as stiffening bridges and dividing the container into cell compartments, and a molded flexible rubber cell jar inserted snugly within each compartment, the flexible rubber bottom walls of said jars being molded to approximately conform to said bottom corrugations and being sufficiently flexible to be accurately seated thereupon by flexing of the rubber corrugations.

3. A storage battery box having a plurality of cells, comprising: a pressed sheet metal outer container having a sheet metal bottom wall, side walls, end walls, and sheet metal partition walls forming a plurality of separate cell compartments, said sheet metal bottom wall having integral deep corrugations therein and extending the length of said container and serving as plate supports for all the separate cells, and a separate molded flexible rubber cell jar inserted snugly within each cell compartment, the flexible rubber bottoms of said jars being molded with corrugations approximately conforming to said metal corrugations and being easily flexed to fit accurately upon said metal corrugations by the weight of the electrolyte.

4. A storage battery box comprising: a pressed sheet metal outer container of rectangular plan form having its two opposed long side walls and its bottom wall bent up from a single piece of sheet metal, and two separate metal end walls, said bottom wall having relatively deep corrugations pressed therein and providing sediment spaces between said corrugations, and a separate molded flexible rubber cell jar inserted snugly within said metal container, said flexible rubber jar having approximately corresponding flexible corrugations molded therein which are easily distortable and fit snugly upon said metal corrugations and be thereby supported over the full bottom area thereof.

5. A storage battery box having a plurality of cells comprising: a sheet metal outer container of rectangular plan form having its two opposed long side walls and its bottom wall bent up from a single piece of sheet metal, two separate sheet metal end walls attached to the otherwise open ends of said one-piece structure, separate transverse sheet metal partitions individually attached in place so as to divide said container into a plurality of cell compartments, a separate molded flexible rubber cell jar inserted snugly into each of said compartments, said flexible rubber cell jars being readily distorted by the weight of the electrolyte contained therein so as to be accurately seated upon the supporting sheet metal structure, and individual cell covers for said rubber cell jars.

HARVEY D. GEYER.